United States Patent
Nanbu et al.

(10) Patent No.: US 7,456,533 B2
(45) Date of Patent: Nov. 25, 2008

(54) MOTOR AND ELECTRIC APPARATUS EQUIPPED WITH A CONDUCTIVE PIN FOR SUPPRESSING ELECTROLYTIC CORROSION

(75) Inventors: Yasuo Nanbu, Fukui (JP); Yoshikazu Sengokudani, Fukui (JP); Yuji Kumagai, Sabae (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 265 days.

(21) Appl. No.: 11/156,517

(22) Filed: Jun. 20, 2005

(65) Prior Publication Data

US 2006/0186746 A1    Aug. 24, 2006

(30) Foreign Application Priority Data

Feb. 23, 2005    (JP) .............................. 2005-046789

(51) Int. Cl.
*H02K 5/08*    (2006.01)
*H02K 5/22*    (2006.01)

(52) U.S. Cl. ...................... 310/71; 310/216; 310/43; 310/89

(58) Field of Classification Search ............... 310/68 R, 310/89, 90, 196, 43, 216, 71
See application file for complete search history.

(56) References Cited

U.S. PATENT DOCUMENTS

| | | | |
|---|---|---|---|
| 3,758,799 A * | 9/1973 | Dochterman et al. | 310/89 |
| 3,867,658 A * | 2/1975 | Dochterman | 310/71 |
| 3,874,073 A * | 4/1975 | Dochterman et al. | 29/598 |
| 3,975,653 A * | 8/1976 | Kawakami et al. | 310/196 |
| 4,656,378 A * | 4/1987 | Atherton et al. | 310/71 |
| 5,194,796 A | 3/1993 | Domeki et al. | |
| 5,689,169 A * | 11/1997 | Kerkman et al. | 318/807 |
| 6,002,185 A * | 12/1999 | Nakao et al. | 310/43 |
| 6,064,133 A * | 5/2000 | Kim et al. | 310/254 |
| 6,118,197 A * | 9/2000 | Bohlen | 310/89 |
| 6,150,743 A * | 11/2000 | Van Dine et al. | 310/89 |
| 6,369,474 B1 * | 4/2002 | Tanaka et al. | 310/71 |
| 6,417,585 B1 * | 7/2002 | Oohashi et al. | 310/58 |

(Continued)

FOREIGN PATENT DOCUMENTS

EP    0 521 709 A2    1/1993

(Continued)

OTHER PUBLICATIONS

Invitation to Pay Additional Fees with Annex to Form PCT ISA/206, Communication Relating to The Results of the Partial International Search for Application No. PCT/JP2005/011201, dated Nov. 22, 2005.

(Continued)

*Primary Examiner*—Karl I Tamai
(74) *Attorney, Agent, or Firm*—RatnerPrestia (57) ABSTRACT

A motor comprises a stator having a stator core and a stator winding wound on the stator core and integrally molded with insulation resin, a rotor provided with a shaft, a first bearing and a second bearing for supporting the shaft, a bracket connected to the stator and retaining at least one of the first bearing and the second bearing, and a conductive member short-circuiting between the stator core and the bracket.

12 Claims, 10 Drawing Sheets

U.S. PATENT DOCUMENTS

| | | | |
|---|---|---|---|
| 6,488,475 B2 * | 12/2002 | Murata et al. | 417/32 |
| 6,593,674 B2 * | 7/2003 | Sanchez et al. | 310/89 |
| 6,700,273 B1 * | 3/2004 | Ojima et al. | 310/166 |
| 6,710,481 B2 * | 3/2004 | Yoshida et al. | 310/71 |
| 6,738,718 B2 * | 5/2004 | Kurnia et al. | 702/41 |
| 6,750,574 B2 * | 6/2004 | Okazaki et al. | 310/68 B |
| 6,867,527 B2 * | 3/2005 | Moore | 310/211 |
| 6,888,280 B2 * | 5/2005 | Dube et al. | 310/177 |
| 2003/0030340 A1 | 2/2003 | Tashiro | |
| 2004/0108780 A1 | 6/2004 | Hoffman et al. | |
| 2005/0134127 A1 * | 6/2005 | Nomura | 310/68 R |
| 2005/0269895 A1 * | 12/2005 | Innami et al. | 310/218 |
| 2005/0275297 A1 * | 12/2005 | Suzuki et al. | 310/71 |
| 2006/0186746 A1 * | 8/2006 | Nanbu et al. | 310/68 R |

FOREIGN PATENT DOCUMENTS

| | | | |
|---|---|---|---|
| JP | 52073312 | * | 6/1977 |
| JP | 52088705 | * | 7/1977 |
| JP | 53-006802 | | 1/1978 |
| JP | 54031502 | * | 3/1979 |
| JP | 07-087696 A | | 3/1995 |
| JP | 07298543 | * | 11/1995 |
| JP | 10-028350 A | | 1/1998 |
| JP | 2000-078819 | | 3/2000 |
| JP | 2000-224796 A | | 8/2000 |
| JP | 2000224796 A | * | 8/2000 |
| JP | 2000-245094 A | | 9/2000 |
| JP | 2000-253612 A | | 9/2000 |
| JP | 2000245094 A | * | 9/2000 |
| JP | 2000253612 A | * | 9/2000 |
| JP | 2001-286695 A | | 10/2001 |
| JP | 2002-119007 A | | 4/2002 |
| JP | 2002204551 A | * | 7/2002 |
| JP | 2002-335649 A | | 11/2002 |
| JP | 2002335649 A | * | 11/2002 |
| JP | 2004-229429 A | | 8/2004 |
| JP | 2004-242413 | | 8/2004 |
| JP | 2004229429 A | * | 8/2004 |
| JP | 1705778 | * | 9/2005 |

OTHER PUBLICATIONS

International Search Report for Application No. PCT/JP2005/011201, dated Mar. 20, 2006.

* cited by examiner

MOTOR AND ELECTRIC APPARATUS EQUIPPED WITH A CONDUCTIVE PIN FOR SUPPRESSING ELECTROLYTIC CORROSION

TECHNICAL FIELD

The present invention relates to a motor to be mounted to an electric apparatus such as an air-conditioning unit for driving a blower fan.

BACKGROUND ART

There is a demand in recent years for improvement in efficiency of fan motors mounted to air conditioners for driving blower fans, for instance, because of the trend of saving energy consumption of the air-conditioning units. There are often cases that highly efficient brushless motors are used for these fan motors in place of induction motors. And in many cases, these brushless motors are driven by inverters of Pulse Width Modulation (hereinafter referred to as "PWM method") as the driving method.

In employment of such PWM method of driving, it is likely that a phenomenon of wavelike wear occurs on bearings rotatably supporting a motor shaft when high-frequency electrolytic corrosion ("electrolytic corrosion") has progressed, which may eventually cause abnormal noises.

Figure 16:
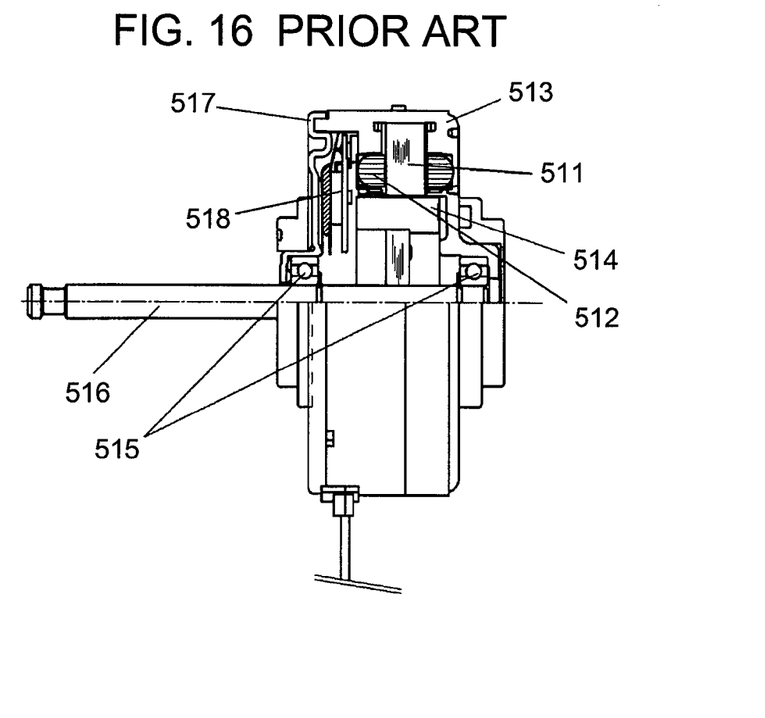
FIG. 16 is a partially sectioned structural view of a brushless motor of the prior art.
Figure 17:
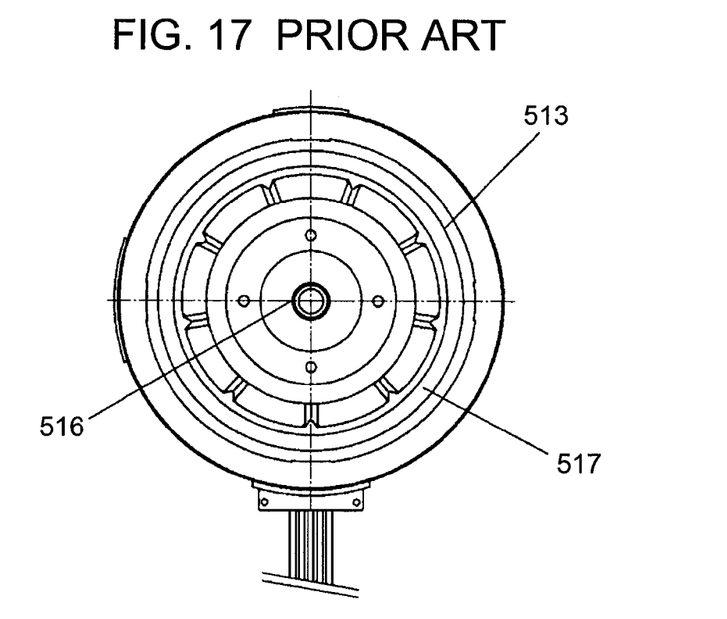
FIG. 17 is a front view of the brushless motor shown in FIG. 16.
Figure 18:
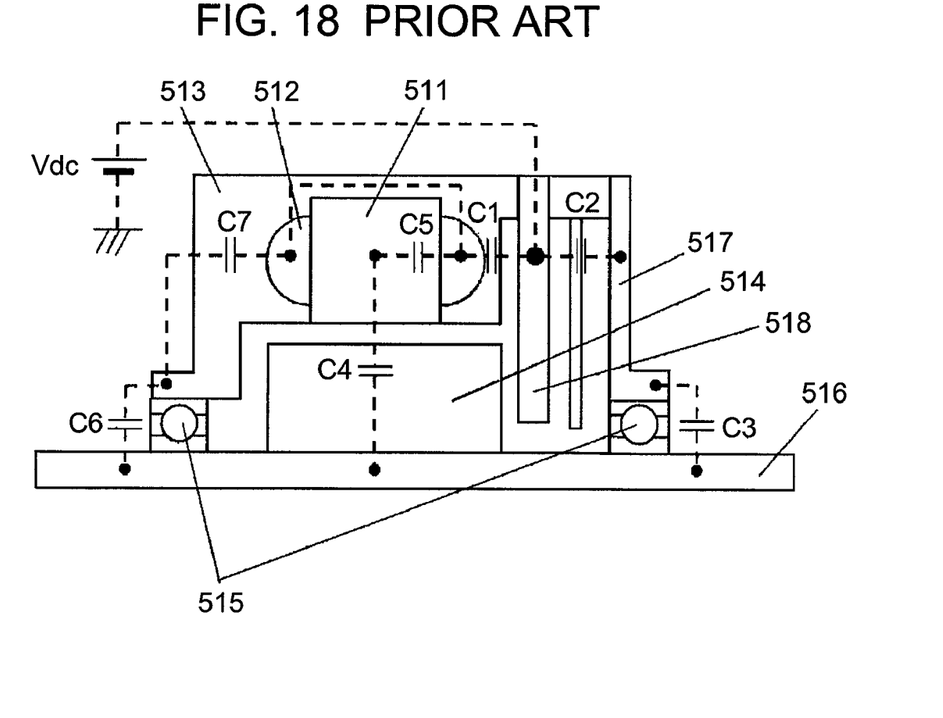
FIG. 18 is a model diagram representing general distribution of stray capacitances in the brushless motor shown in FIG. 16.

Among conventional brushless motors of this kind, one example is disclosed in Japanese Patent Unexamined Publication, No. 2004-242413. Referring now to FIG. 16 to FIG. 18, description is provided of this kind of the conventional brushless motor. FIG. 16 is a partially sectioned view showing a structure of a conventional brushless motor, FIG. 17 a front view of the brushless motor shown in FIG. 16, and FIG. 18 a model diagram representing general distribution of stray capacitances in the brushless motor shown in FIG. 16.

In FIG. 16 and FIG. 17, a stator is composed of stator winding 512 wound on stator core 511 and molded with insulation resin 513. Rotor 514 is placed inside the stator with a clearance between them. Two bearings 515 are attached to shaft 516 of rotor 514. These two bearings 515 are fixed to respective positions of insulation resin 513 of the stator. Shaft 516 is supported by two bearings 515 in a manner to keep rotor 514 rotatable.

This brushless motor also includes printed wiring board 518 having a drive circuit mounted to it. This printed wiring board 518 is fixed to a position with bracket 517 when press-fitted to the stator.

In the above structure of the conventional motors of this kind, however, no measures had ever been taken against electrolytic corrosion. There had hence been problems such as those described below.

In other words, the above structure of the conventional motors carries stray capacitances C1 to C7 and so on, among the individual structural components due to its configuration, as shown in FIG. 18. When stator winding 512 of this conventional motor is driven by an inverter of the PWM method, through currents flow through the stray capacitances C1 to C7 and the like. These currents produce differences in electric potential among the individual structural components, and they consequently cause electrolytic corrosion under certain conditions.

The conditions especially known to help develop the electrolytic corrosion include a case in which the motor is operated for a long duration of time without large variations in the rotating speed when temperature is comparatively low in a region where a voltage supplied to the motor is high (e.g., the region with commercial power supply of 240V). Described below is one example of the mechanisms that produce electrolytic corrosion.

When stator winding 512 is driven by an inverter of the PWM method, a high-frequency circulating current flows in a loop along the stray capacitances C1 to C7 of the individual structural components, from stator core 511 through stator winding 512, printed wiring board 518, bracket 517, bearings 515, shaft 516, rotor 514, and returns to stator core 511. This current causes a phenomenon of electric discharge attributable to a local dielectric breakdown inside bearings 515 if a film of grease serving the lubricant breaks off or decreases in thickness during this moment, and forms tiny discharge marks on rolling surfaces of bearings 515. If the above phenomenon continues over a long period of time, it may eventually result in electrolytic corrosion. Presence or absence of this discharge phenomenon is closely related to a value of voltage appearing across each of stray capacitances C3 and C6, or bearings 515, when divided by C1 through C7. Here, a voltage source "Vdc" shown in the figure represents a voltage applied to printed wiring board 518.

This phenomenon of electrolytic corrosion roughens the rolling surfaces of bearings 515, and eventually leads the motor to generate abnormal noises when repeated until the surfaces are worn into wavelike form. One example that shall be noted among the measures to prevent this phenomenon is a method of using bearings provided with balls made of ceramic, or non-conductive material, between inner rings and outer rings. However, the bearings provided with ceramic balls are very expensive, and they have not as yet come to wide use in mass production.

Other methods include use of electrically conductive grease for the bearings, grounding the stator core, lowering a carrier frequency of the PWM driver, and the like. None of the above methods is entirely satisfactory, however, in view of the reliability, cost, quality and convenience of use, and they have not as yet been adopted for practical use. The measures to prevent electrolytic corrosion thus entail an increase in cost of the bearings and materials of the motor, and a decrease in the convenience of use, as described above.

SUMMARY OF THE INVENTION

A motor of the present invention has a structure discussed hereinafter. The motor comprises a stator having a stator core and a stator winding wound on the stator core and integrally molded with insulation resin, a rotor provided with a shaft, a first bearing and a second bearing for supporting the shaft, a bracket connected to the stator and retaining at least one of the first bearing and the second bearing, and a conductive member short-circuiting between the stator core and the bracket.

This structure short-circuits and equalizes potentials between the stator core and the bracket by way of the conductive member, and substantially reduces a voltage impressed on the bearings, thereby suppressing development of electrolytic corrosion. As a result, this invention makes measures such as use of bearings with ceramic balls unnecessary, and it can thus provide the motor having means of avoiding the electrolytic corrosion with a comparatively simple structure at a low cost. In this structure, the conductive member exhibits a large effect when it short-circuits the bracket and the stator core at one side adjoining the printed wiring board.

DETAILED DESCRIPTION OF PREFERRED EMBODIMENTS

Description is provided hereinafter of the preferred embodiments of the present invention with reference to the accompanying drawings.

First Exemplary Eembodiment

Figure 1:
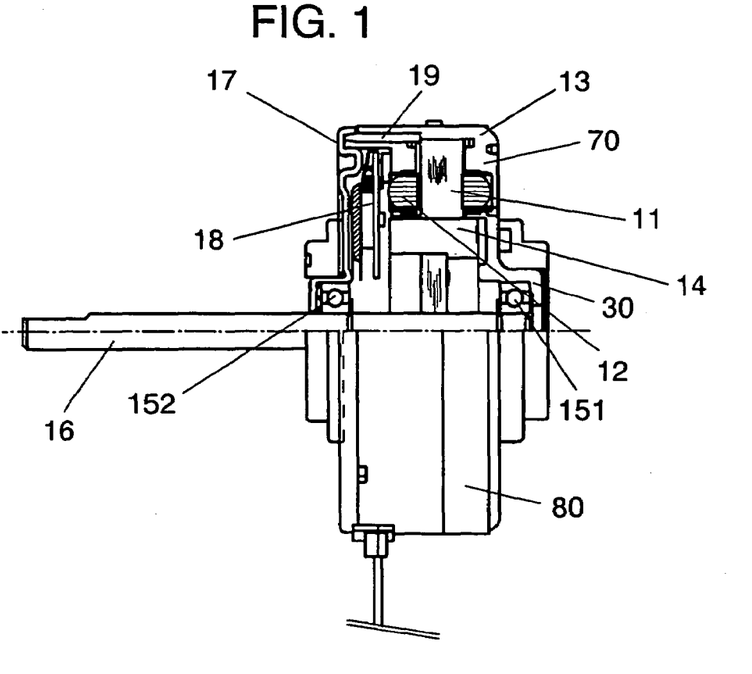
FIG. 1 is a partially sectioned structural view of a motor according to a first exemplary embodiment of the present invention.
Figure 2:
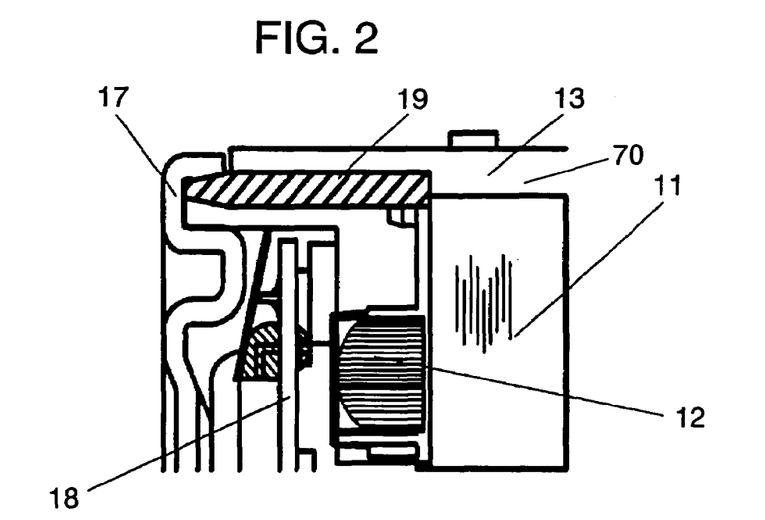
FIG. 2 is an enlarged sectional view showing a structure around a conductive pin (i.e., conductive member) shown in FIG. 1.

FIG. 1 is a partially sectioned structural view of a motor according to a first exemplary embodiment of this invention, and FIG. 2 is an enlarged sectional view showing a structure around a conductive pin (i.e., conductive member) shown in FIG. 1.

Motor 80 shown in FIG. 1 represents a fan motor for an indoor unit of an air conditioner (may be referred to hereinafter as "indoor unit motor"). In FIG. 1, motor 80 of this embodiment comprises stator 70 having stator core 11 and stator winding 12 wound on stator core 11 and integrally molded with insulation resin 13, rotor 14 provided with shaft 16, first bearing 151 and second bearing 152 for supporting shaft 16, bracket 17 connected to stator 70 and retaining at least one of first bearing 151 and second bearing 152, and conductive member 19 short-circuiting between stator core 11 and bracket 17.

Description is provided further of the structure of motor 80 in detail with reference to FIG. 1 and FIG. 2. Stator winding 12 is wound on stator core 11 insulated with resin. Stator core 11 and stator winding 12 are integrally molded with insulation resin 13 to form stator 70. Printed wiring board 18 provided with a drive circuit for driving motor 80 is also molded together into one integral body in the same molding process. A complete molded body of stator 70 is thus composed with addition of printed wiring board 18. Insulation resin 13 used here is unsaturated polyester resin, a kind of thermosetting plastic.

On the other hand, shaft 16 is press-fitted to rotor 14. In addition, two bearings, first bearing 151 and second bearing 152 are attached to shaft 16 for supporting shaft 16 in a rotatable manner. Bracket 17 is fixed to stator 70.

Rotor 14 provided with first bearing 151 and second bearing 152 fixed to its shaft 16 is assembled with a certain clearance to the complete molded body of stator 70 equipped with printed wiring board 18, to composed motor 80. First bearing 151 is retained by housing 30 formed on stator 70, and second bearing 152 is retained by bracket 17. Furthermore, motor 80 of this exemplary embodiment has a structure that stator core 11 and bracket 17 are short-circuited with conductive pin 19 defining a conductive member, as shown in FIG. 2.

Here, conductive pin 19 is disposed to an outer part of stator core 11, and bracket 17 is press-fitted to stator 70 in a manner to deform both ends of conductive pin 19 at points where they abut on stator core 11 and bracket 17, or to cause the both ends to bite into stator core 11 and bracket 17, so as to make it short-circuit between stator core 11 and bracket 17.

Since this structure short-circuits and equalizes electric potentials between stator core 11 and bracket 17 by way of conductive pin 19, it substantially reduces a voltage impressed on the two bearings 151 and 152, thereby suppressing development of electrolytic corrosion. As a result, this embodiment makes measures such as use of bearings with ceramic balls unnecessary, and it can thus provide the motor having means of avoiding the electrolytic corrosion with a comparatively simple structure at a low cost. This structure exhibits a large effect when the short circuit is made between bracket 17 and stator core 11 at the side adjoining printed wiring board 18, as shown in FIG. 2.

Second Exemplary Eembodiment

Figure 3:
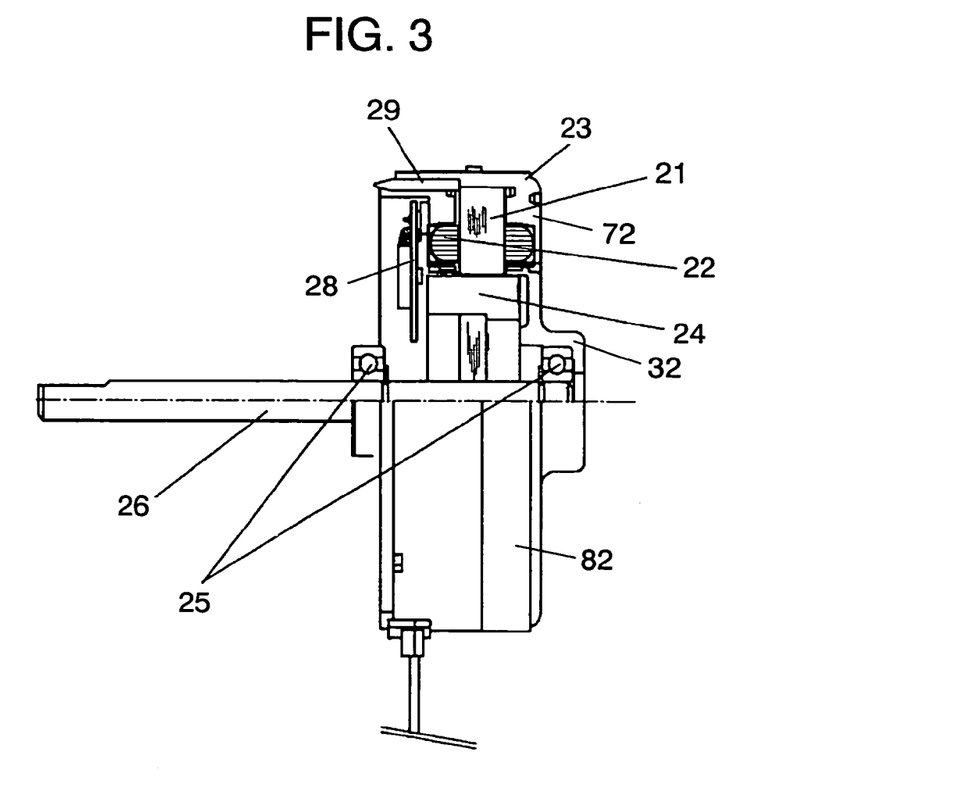
FIG. 3 is a partially sectioned structural view of a motor before a bracket is press-fitted according to a second exemplary embodiment of this invention.
Figure 4:
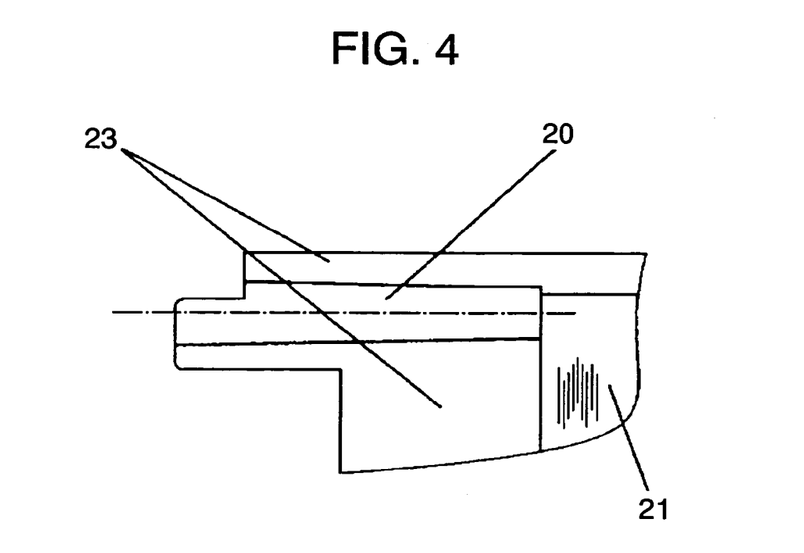
FIG. 4 is an enlarged sectional view showing a structure around an insertion hole for a conductive pin (i.e., conductive member) shown in FIG. 3.

FIG. 3 is a partially sectioned structural view of a motor before a bracket is press-fitted according to a second exemplary embodiment of this invention, and FIG. 4 is an enlarged sectional view showing a structure around an insertion hole for a conductive pin (i.e., conductive member) shown in FIG. 3.

Stator winding 22 is wound on stator core 21 insulated with resin. Stator core 21 and stator winding 22 are integrally molded with insulation resin 23 to form stator 72. Printed wiring board 28 provided with a drive circuit for driving motor 82 is also molded together into one integral body in the same molding process. A complete molded body of stator 72 is thus composed with addition of printed wiring board 28. Insulation resin 23 used here is unsaturated polyester resin, that is a thermosetting plastic.

On the other hand, shaft 26 is press-fitted to rotor 24. In addition, two bearings 25 (i.e., first bearing and second bearing) are attached to shaft 26 for supporting shaft 26 in a rotatable manner.

Rotor 24 provided with two bearings 25 fixed to its shaft 26 is assembled with a certain clearance to the complete molded body (stator 72) equipped with printed wiring board 28. Motor 82 is completed thereafter when a bracket (not shown in the figures) is press-fitted to stator 72. One of the bearings 25 (i.e., the first bearing) is retained by housing 32 formed on stator 72, and the other one of bearings 25 (i.e., the second bearing) is retained by bracket (not shown). In addition, motor 82 of this exemplary embodiment has a structures that stator core 21 and the bracket (not shown) are short-circuited with conductive pin 29 defining the conductive member.

Description is provided here of conductive pin 29 in more detail. FIG. 4 is an enlarged sectional view showing a structure around insertion hole 20 for conductive pin 29. A tip end of conductive pin 29 protrudes beyond a side face of the complete molded body formed of insulation resin 23 as shown in FIG. 3. It is therefore possible that, when the bracket (not shown) similar to bracket 17 in FIG. 2 is press-fitted, it deforms both ends of conductive pin 29 or causes the both ends to bite into the bracket and stator core 21 to ensure an electrical continuity between them. Conductive pin 29 is disposed to an outer part of stator core 21 as shown in FIG. 4, and it short-circuits between the bracket and stator core 21 when the bracket is press-fitted to stator 72. The reason why conductive pin 29 is disposed to the outer part of stator core 21 is the concentrated winding method used here, that stator winding 22 is wound around teeth of stator core 21 in order to improve an efficiency of the motor. For this reason, stator 72 has such a structure that stator core 21 is exposed only in areas around its periphery or outer edges.

Here, FIG. 3 and FIG. 4 show an example in which conductive pin 29 is inserted into insertion hole 20. However, conductive pin 29 may be fixed to stator core 21 in advance by press-fitting, welding, or the like method before being molded into an integral body with insulation resin 23, so that the structure has conductive pin 29 protruding from the complete molded body.

Like advantages as those of the first exemplary embodiment can also be anticipated with the motor of this second exemplary embodiment.

Third Exemplary Eembodiment

Figure 5:
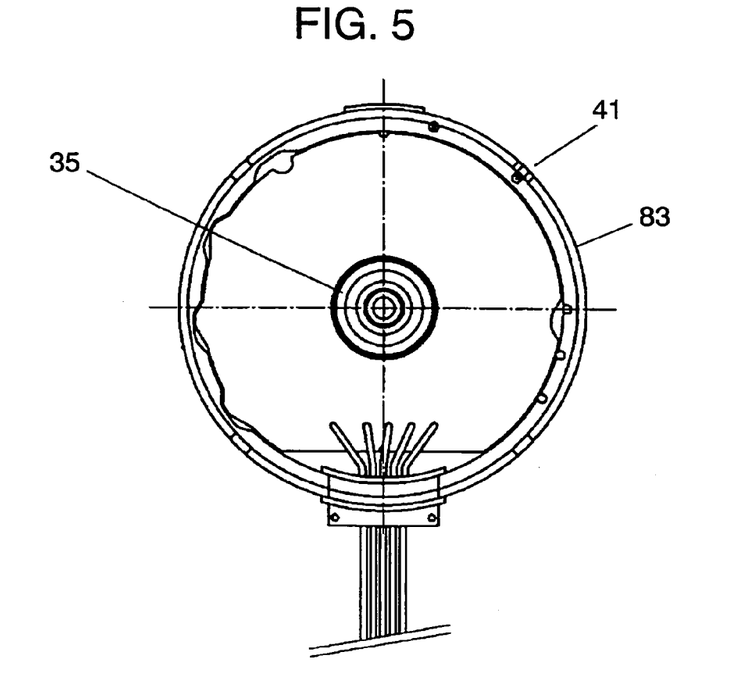
FIG. 5 is a front view of a motor before a bracket is press-fitted according to a third exemplary embodiment of this invention.
Figure 6:
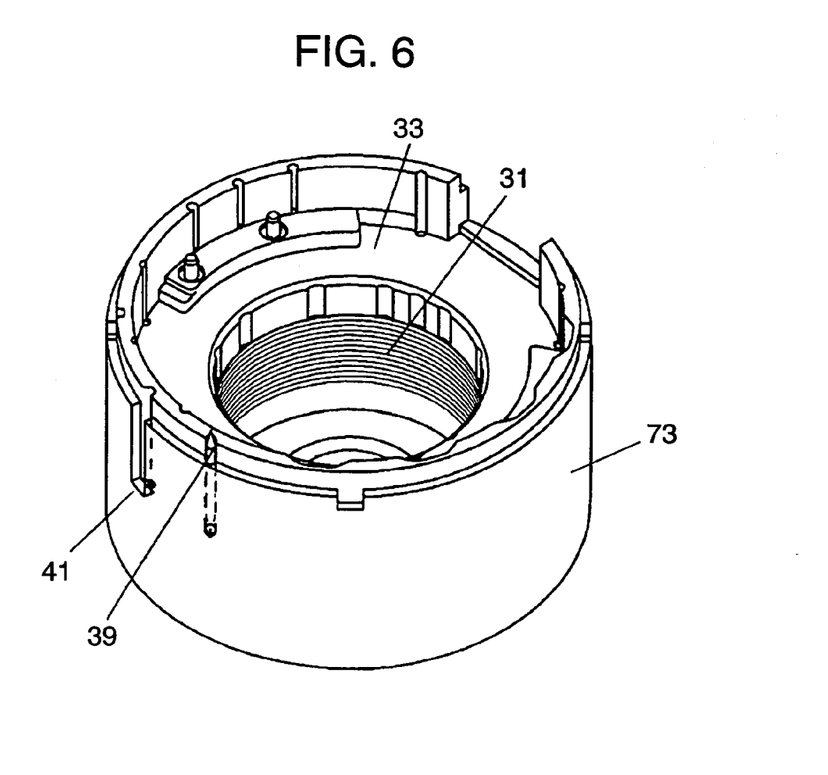
FIG. 6 is a perspective view of a complete molded body (i.e., stator) according to the third exemplary embodiment.
Figure 7:
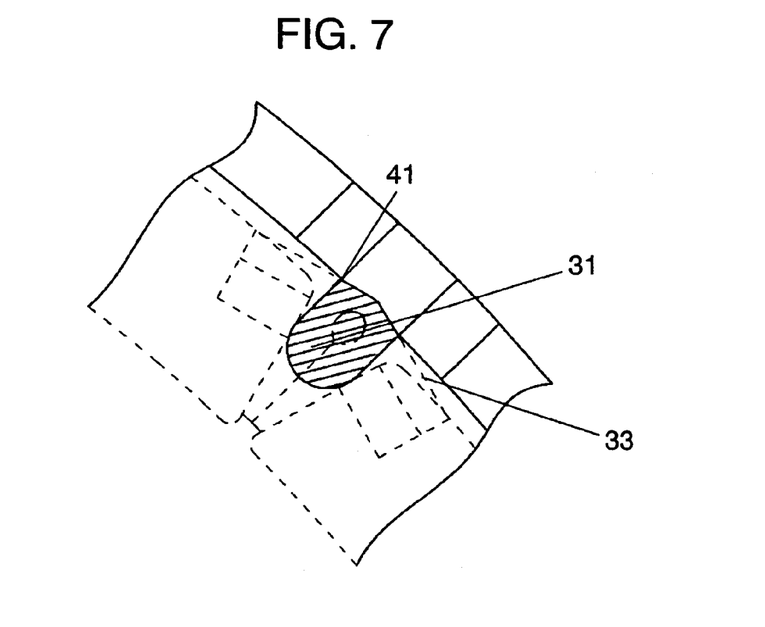
FIG. 7 is an enlarged front view of a continuity check slit (i.e., notch) shown in FIG. 5.
Figure 8:
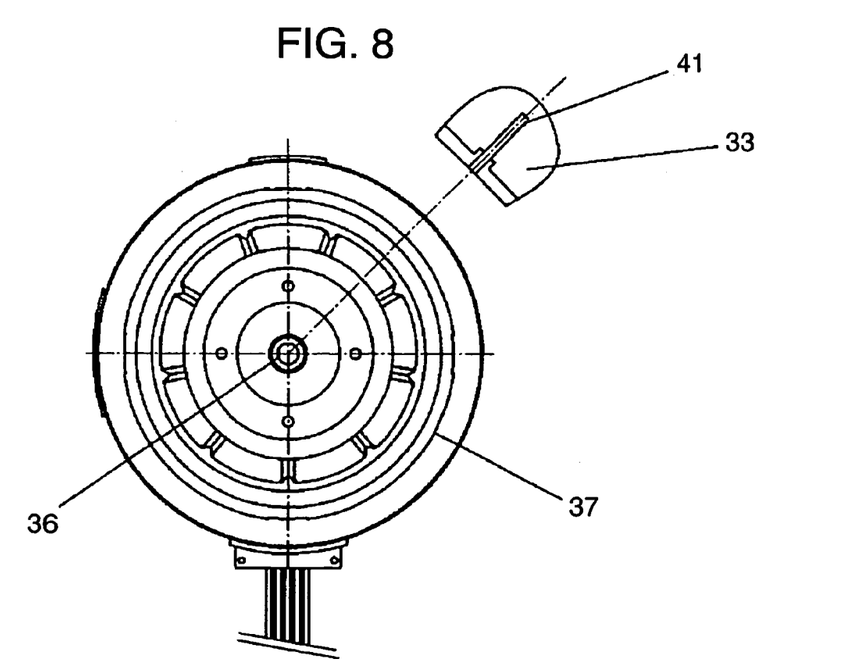
FIG. 8 is a front view of the motor shown in FIG. 5 after the bracket is press-fitted.

FIG. 5 is a front view of a motor before a bracket is press-fitted according to a third exemplary embodiment of this invention, FIG. 6 a perspective view of a complete molded body (i.e., stator) according to the third exemplary embodiment, FIG. 7 an enlarged front view of a continuity check slit (i.e., notch) shown in FIG. 5, and FIG. 8 a front view of the motor shown in FIG. 5 after the bracket is press-fitted.

A stator winding is wound on stator core 31 insulated with resin. Stator core 31 and the stator winding are integrally molded with insulation resin 33 to form stator 73. Insulation resin 33 used here is unsaturated polyester resin, a kind of thermosetting plastic.

Bearing 35 is attached to shaft 36 of a rotor for supporting shaft 36 in a rotatable manner. After the rotor is assembled into stator 73, bracket 37 is press-fitted to stator 73 to complete motor 83. Motor 83 of this exemplary embodiment has such a structure that stator core 31 and bracket 37 are short-circuited with conductive pin 39 defining a conductive member. Conductive pin 39 is inserted through insertion hole.

In this exemplary embodiment, the complete molded body of stator 73 is provided with at least one notch 41 in an outer periphery thereof, so that a part of stator core 31 is accessible through notch 41, as shown in FIG. 5 and FIG. 6. This notch 41 is used as a slit (i.e., continuity check slit) for confirming an electrical continuity of conductive pin 39, maintaining a short-circuit between stator core 31 and bracket 37.

With this structure of adopting the continuity check slit, bracket 37 does not completely cover the exposed surfaces of stator core 31 even when bracket 37 is press-fitted as shown in FIG. 8, so as to allow confirmation of the electrical continuity easily between stator core 31 and bracket 37. FIG. 7 is an enlarged front view of the continuity check slit, or notch 41, showing the accessible portion of stator core 31 by hatching. As a method of checking the electrical continuity, any continuity check instrument can be used such as a tester, multimeter and earth continuity checker to determine the continuity.

Like advantages as those of the first exemplary embodiment can also be anticipated with the motor of this third exemplary embodiment.

Fourth Exemplary Eembodiment

Figure 9A:
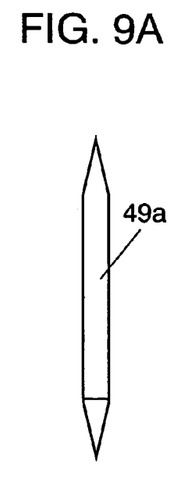
FIG. 9A is a side view of a conductive pin (i.e., conductive member) having a conical shape at both ends according to a fourth exemplary embodiment of this invention.
Figure 9B:
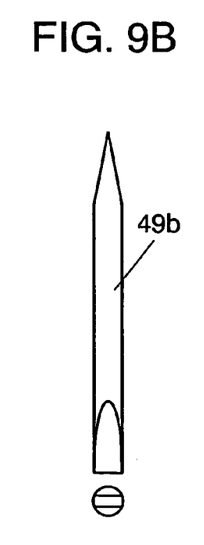
FIG. 9B is a side view of another conductive pin (i.e., conductive member) having a conical shape at one end and a flat-sided shim-like shape at the other end according to the fourth exemplary embodiment.
Figure 9C:
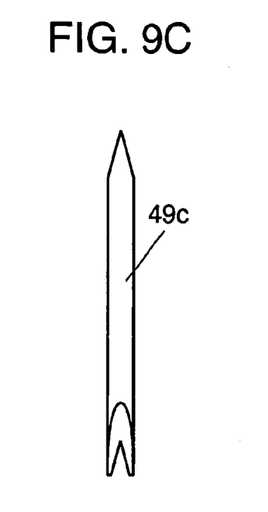
FIG. 9C is a side view of still another conductive pin (i.e., conductive member) having a conical shape at one end and a fork-like shape at the other end according to the fourth exemplary embodiment.

FIG. 9A is a side view of a conductive pin (i.e., conductive member) having a conical shape at both ends thereof according to a fourth exemplary embodiment of this invention, FIG. 9B a side view of another conductive pin (i.e., conductive member) having a conical shape at one end and a flat-sided shim-like shape at the other end according to the fourth exemplary embodiment, and FIG. 9C a side view of still another conductive pin (i.e., conductive member) having a conical shape at one end and a fork-like shape at the other end according to the fourth exemplary embodiment.

Except for these conductive pins, a motor structure adaptable for this fourth exemplary embodiment can be of any configuration such as those illustrated in the above first through the third exemplary embodiments.

FIG. 9A shows a side view of the conductive pin which short-circuits a stator core and a bracket of the motor according to the fourth exemplary embodiment of this invention. Conductive pin 49a shown in FIG. 9A has a conical shape at both ends of it, so that the bracket, when fitted to the stator core, can deform the conical portions at the ends of conductive pin 49a or make them bite into the stator core and the bracket to short-circuit between them.

FIG. 9B is a side view of another conductive pin for short-circuiting the stator core and the bracket of the motor according to the fourth exemplary embodiment of this invention. Conductive pin 49b shown in FIG. 9B has a conical shape at one end and a flat-sided shim-like shape at the other end. The shim-like shape with flat sides brings this end of conductive pin 49b into a surface contact, whereas the both ends of conductive pin 49a shown in FIG. 9A make point contacts.

FIG. 9C is a side view of still another conductive pin for short-circuiting the stator core and the bracket of the motor according to the fourth exemplary embodiment of this invention. Conductive pin 49c shown in FIG. 9C has a conical shape at one end and a fork-like shape at the other end. This is an improved design of conductive pin 49b shown in FIG. 9B, a structure of which has a forked end at the flat-sided portion to ensure the short-circuiting between the stator core and the bracket more positively. Materials suitable for these conductive pins include brass and iron. On the other hand, the materials of good resistance to corrosion such as brass and stainless steel are more desirable for fan motors intended for outdoor use.

Like advantages as those of the first exemplary embodiment can also be anticipated with the motor of this fourth exemplary embodiment.

Fifth Exemplary Eembodiment

Figure 10:
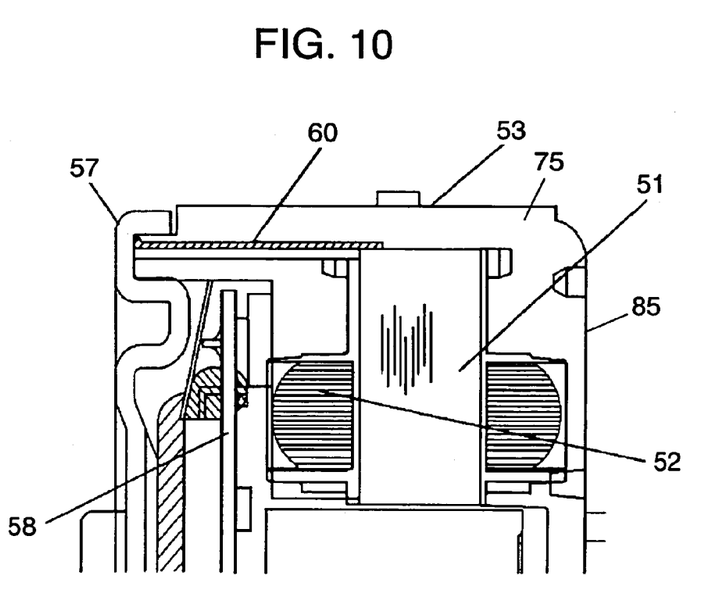
FIG. 10 is a sectioned view showing a structure around a metal terminal (i.e., conductive member) according to a fifth exemplary embodiment of this invention.

FIG. 10 is a sectional view showing a structure around a metal terminal (i.e., conductive member) according to a fifth exemplary embodiment of this invention.

Description is provided of a structure of motor 85 in FIG. 10. Stator winding 52 is wound on stator core 51 insulated with resin. Stator core 51 and stator winding 52 are integrally molded with insulation resin 53 to form stator 75. Printed wiring board 58 provided with a drive circuit for driving motor 85 is also molded together into one integral body in the same molding process. A complete molded body of stator 75 is thus composed with addition of printed wiring board 58. Insulation resin 53 used here is unsaturated polyester resin, a kind of thermosetting plastic.

On the other hand, a rotor and bearings in motor 85 of this fifth exemplary embodiment have structures similar to rotor 14 and bearings 151 and 152 shown in FIG. 1. Bracket 57 is fixed to stator 75.

Motor 85 of the fifth exemplary embodiment differs from motor 80 of the first exemplary embodiment described above in respect that motor 85 employs metal terminal 60 as a conductive member in place of conductive pin 19 of motor 80. In other words, it uses metal terminal 60 to short-circuit between stator core 51 and bracket 57. In this structure, metal terminal 60 is fixed to stator core 51 by spot welding or press-fitting, before being molded into an integral body with insulation resin 53. A tip end of metal terminal 60 confronting bracket 57 is curled so that it maintains a large contact area and flexibility to ensure reliable contact with bracket 57.

Like advantages as those of the first exemplary embodiment can also be anticipated with the motor of this fifth exemplary embodiment.

Sixth Exemplary Eembodiment

Figure 11:
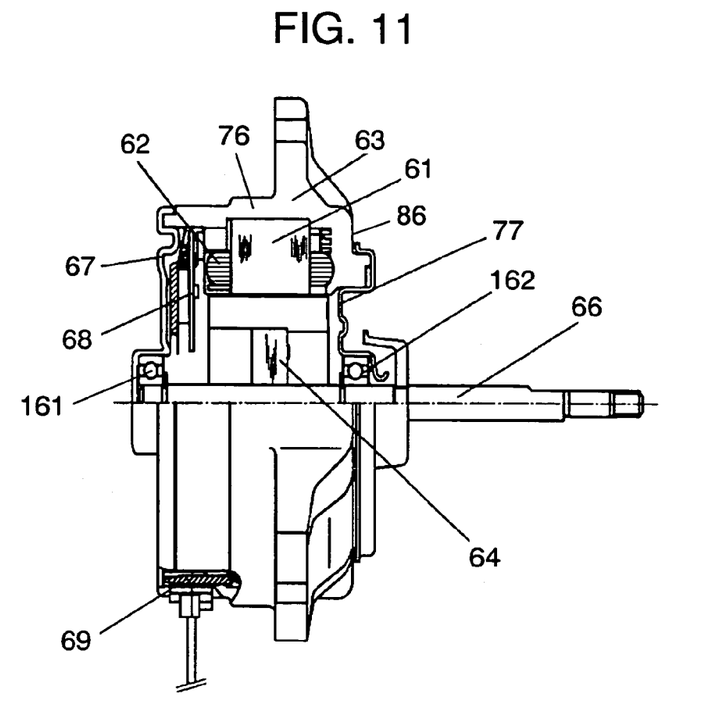
FIG. 11 is a partially sectioned structural view of a motor according to a sixth exemplary embodiment of this invention.

FIG. 11 is a partially sectioned structural view of a motor according to a sixth exemplary embodiment of this invention, and it represents a fan motor used for an outdoor unit of an air conditioner (may be referred to hereinafter as "outdoor unit motor").

Referring to FIG. 11, description is provided of a structure of motor 86 of this sixth exemplary embodiment. Stator winding 62 is wound on stator core 61 insulated with resin. Stator core 61 and stator winding 62 are integrally molded with insulation resin 63 to form stator 76. Printed wiring board 68 provided with a drive circuit for driving motor 86 is also molded together into one integral body in the same molding process. A complete molded body of stator 76 is thus composed with addition of printed wiring board 68. Insulation resin 63 used here is unsaturated polyester resin, a kind of thermosetting plastic.

On the other hand, shaft 66 is press-fitted to rotor 64. In addition, two bearings, first bearing 161 and second bearing 162 are attached to shaft 66 for supporting shaft 66 in a rotatable manner. First bracket 67 and second bracket 77 are fixed to stator 76.

Rotor 64 provided with first bearing 161 and second bearing 162 fixed to its shaft 66 is assembled with a certain clearance to the complete molded body of stator 76 equipped with printed wiring board 68, to composed motor 86. First bearing 161 is retained by first bracket 67, and second bearing 162 is retained by second bracket 77.

Furthermore, motor 86 of this sixth exemplary embodiment has a structure that stator core 61 and first bracket 67 are short-circuited with conductive pin 69 defining a conductive member. This motor 86 differs from indoor unit motor 80 shown in FIG. 1 in respects that conductive pin 69 is disposed to the lower part (i.e., the side next to lead wires) in FIG. 11, and first bearing 161 is retained by first bracket 67.

In the case of outdoor unit motor 86 shown in FIG. 11, there is concern that ingress of water into motor 86 occurs through a gap in the periphery of conductive pin 69 since it may be exposed to wind and rain depending on the use environment. One of the measures to prevent the above problem is to place conductive pin 69 in such a position that comes to the lower side when the motor is mounted. The area around conductive pin 69 hence gets no direct exposure to wind and rain, thereby avoiding ingress of the water into motor 86.

Notwithstanding the above, conductive pin 69 may be disposed to the upper side of motor 86, if the structure is such that conductive pin 69 is fixed to stator core 61 by press-fitting or welding, and molded into an integral form with insulation resin 63, as discussed previously.

It is widely known that electrolytic corrosion often occurs in first bearing 161 which is adjacent to printed wiring board 68. The effect of reducing a voltage impressed on both bearings 161 and 162 is larger when conductive pin 69 is used to short-circuit stator core 61 to first bracket 67 rather than second bracket 77 for the reason stated previously. Accordingly, same structure is also adopted for outdoor unit motor 86.

It is also appropriate to use a metal terminal similar to the one employed in the fifth exemplary embodiment, in place of conductive pin 69, to short-circuit stator core 61 and first bracket 67.

Seventh Exemplary Eembodiment

Figure 12:
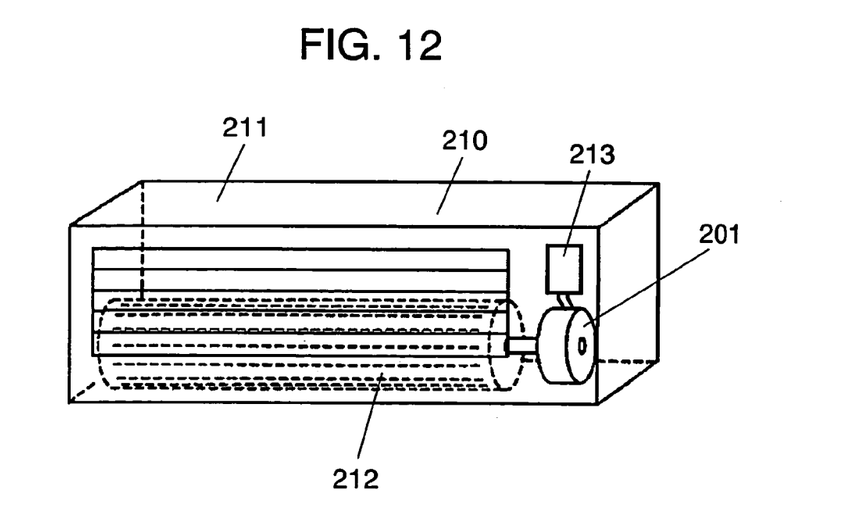
FIG. 12 is a structural drawing showing an indoor unit of a room air conditioner (i.e., electric apparatus) according to a seventh exemplary embodiment of this invention.

FIG. 12 is a structural drawing of an indoor unit of an air conditioner (i.e., electric apparatus) according to a seventh exemplary embodiment of this invention.

In FIG. 12, indoor unit 210 of the air conditioner is equipped with motor 201 inside enclosure 211. Motor 201 carries cross-flow fan 212 mounted to its shaft as a blower fan. Motor 201 is driven by inverter 213 of the pulse-width modulation method. Motor 201 rotates when energized by inverter 213, and cross-flow fan 212 also rotates. Rotation of cross-flow fan 212 delivers air that is conditioned by a heat exchanger (not shown) in the indoor unit into a room. Here, any of the motors in the first to sixth exemplary embodiments described above is adaptable for motor 201. The indoor unit of air conditioner of this invention is equipped with a motor and a blower fan driven by the motor, and that the motor used is one of the motors in the above exemplary embodiments of this invention.

Since the motor equipped in the indoor unit of the air conditioner of this invention is provided with the conductive member for short-circuiting and equalizing electric potentials between the stator core and the bracket, it can substantially reduce the voltage impressed on the bearings, thereby suppressing development of electrolytic corrosion. Therefore, this invention allows the indoor unit to use the motor having comparatively simple means of avoiding the electrolytic corrosion at a low cost, without taking any measures such as use of bearings with ceramic balls.

Eighth Exemplary Eembodiment

Figure 13:
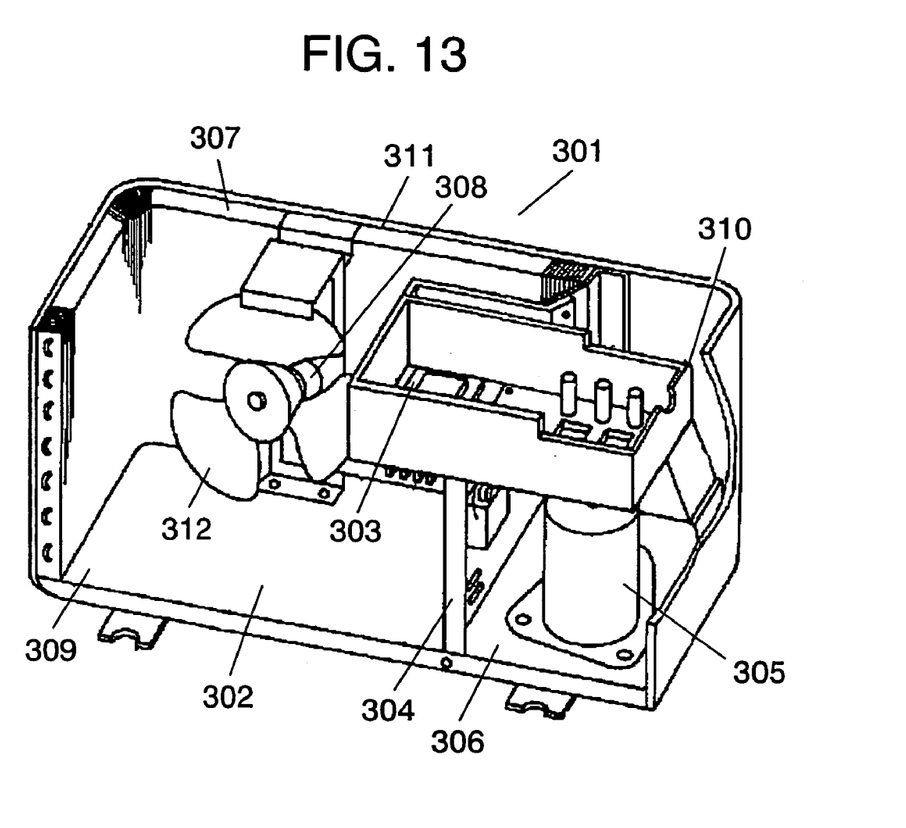
FIG. 13 is a structural drawing showing an outdoor unit of a room air conditioner (i.e., electric apparatus) according to an eighth exemplary embodiment of this invention.

FIG. 13 is a structural drawing of an outdoor unit of an air conditioner (i.e., electric apparatus) according to an eighth exemplary embodiment of this invention.

In FIG. 13, outdoor unit 301 of the air conditioner is equipped with motor 308 inside enclosure 311. Motor 308 carries blower fan 312 mounted to its shaft. Outdoor unit 301 of the air conditioner is separated into compressor room 306 and heat exchanger room 309 by bulkhead 304 disposed vertically to bottom plate 302 of enclosure 311. Compressor 305 is placed in compressor room 306. Heat exchanger 307 and motor 308 are placed in heat exchanger room 309. Electric compartment 310 is disposed above bulkhead 304.

Motor 308 is driven by inverter 303 of the pulse-width modulation method housed in electrical compartment 310, and as motor 308 rotates blower fan 312 also rotates to deliver air to heat exchanger room 309 through heat exchanger 307. Here, any of the motors in the first to sixth exemplary embodiments described above is adaptable for motor 308.

The outdoor unit of air conditioner of this invention is equipped with a motor and a blower fan driven by the motor, and that the motor used is one of the motors in the above exemplary embodiments of this invention. Like advantages as those of the above seventh exemplary embodiment can be anticipated for the outdoor unit of the air conditioner of this invention.

Ninth Exemplary Eembodiment

Figure 14:
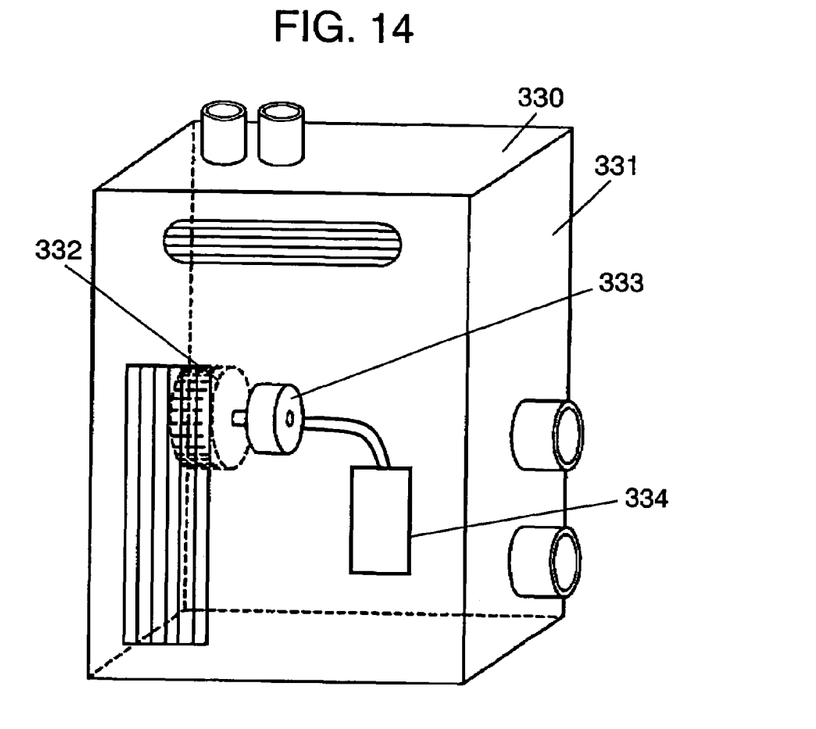
FIG. 14 is a structural drawing showing a water heater (i.e., electric apparatus) according to a ninth exemplary embodiment of this invention.

FIG. 14 is a structural drawing of a water heater (i.e., electric apparatus) according to a ninth exemplary embodiment of this invention.

In FIG. 14, water heater 330 is equipped with motor 333 inside of enclosure 331. Motor 333 carries blower fan 332 mounted to its shaft. Motor 333 is driven by inverter 334 of the pulse-width modulation method. Motor 333 rotates when energized by inverter 334, and blower fan 332 also rotates. Rotation of blower fan 332 delivers air required for combustion into a fuel vaporizing chamber (not shown). Here, any of the motors in the first to sixth exemplary embodiments described above is adaptable for motor 333.

The water heater of this invention is equipped with a motor and a blower fan driven by the motor, and that the motor used is one of the motors in the above exemplary embodiments of this invention. Like advantages as those of the above seventh exemplary embodiment can be anticipated for the water heater of this invention.

Tenth Exemplary Eembodiment

Figure 15:
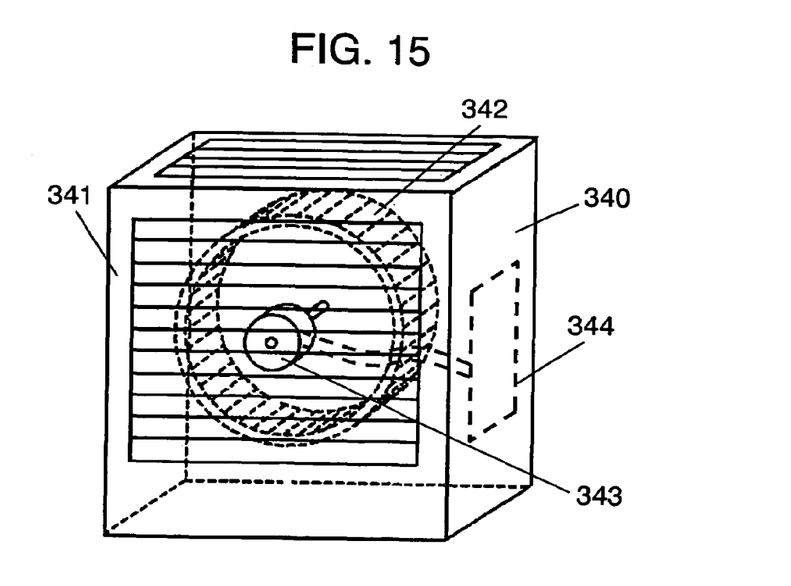
FIG. 15 is a structural drawing showing an air cleaner (i.e., electric apparatus) according to a tenth exemplary embodiment of this invention.

FIG. 15 is a structural drawing of an air cleaner (i.e., electric apparatus) according to a tenth exemplary embodiment of this invention.

In FIG. 15, air cleaner 340 is equipped with motor 343 inside of enclosure 341. Motor 343 carries blower fan 342 mounted to its shaft. Motor 343 is driven by inverter 344 of the pulse-width modulation method. Motor 343 rotates when energized by inverter 344, and blower fan 342 also rotates. Rotation of blower fan 342 circulates air. Here, any of the motors in the first to sixth exemplary embodiments described above is adaptable for motor 343.

The air cleaner of this invention is equipped with a motor and a blower fan driven by the motor, and that the motor used is one of the motors in the above exemplary embodiments of this invention. Like advantages as those of the above seventh exemplary embodiment can be anticipated for the air cleaner of this invention.

In the above teaching, descriptions were provided of the motors installed in the air conditioner's outdoor unit, the air conditioner's indoor unit, the water heater, the air cleaner and the like as embodied examples of the electric apparatuses of this invention. However, this invention is also applicable to other motors such as motors mounted to a variety of information apparatuses and motors used for industrial equipment as needless to mention.

INDUSTRIAL APPLICABILITY

A motor according to the present invention has a structure in which the motor is molded with insulation resin, and a stator core and a bracket are short-circuited with a conductive member. The structure can thus reduce a voltage impressed on a bearing, and prevent electrolytic corrosion and a phenomenon of wave-like wear of the bearing. The invention is therefore sought to be useful for apparatuses such as indoor and outdoor units of air conditioners, water heaters and air cleaners, motors of which take demands for low cost and long serviceable life.

The invention claimed is:

1. A motor comprising:
a stator having a stator core and a stator winding wound on the stator core along a wound surface of the stator core and integrally molded with insulation resin, the integrally molded insulation resin defining a channel;
a rotor provided with a shaft;
a first bearing and a second bearing for supporting the shaft;
a bracket connected to the stator and retaining at least one of the first bearing or the second bearing; and
a solid conductive pin configured to be disposed in the channel of the molded insulation resin for providing a short-circuit between the stator core and the bracket such that a first end of the solid conductive pin bites into the wound surface of the stator core and a second end of the solid conductive pin bites into the bracket,
wherein the insulation resin extends from an edge of the wound surface of the stator core such that the solid conductive pin projects toward the bracket from a portion of the edge of the wound surface and a portion of the extended insulation resin.

2. The motor of claim 1, further comprising a further bracket, wherein both of the first bearing and the second bearing are retained by the bracket and further bracket.

3. The motor of claim 2, said motor included in an electric apparatus which further includes a blower fan driven by the motor.

4. The motor of claim 1 further comprising a housing formed on the stator, wherein the first bearing is retained by the housing, and the second bearing is retained by the bracket.

5. The motor of claim 4, said motor included in an electric apparatus which further includes a blower fan driven by the motor.

6. The motor of claim 1, wherein the integrally molded stator has at least one notch in an outer periphery thereof, and a part of the stator core is accessible through the notch.

7. The motor of claim 6, said motor included in an electric apparatus which further includes a blower fan driven by the motor.

8. The motor of claim 1, wherein the motor is driven by an inverter using a pulse-width modulation method.

9. The motor of claim 8, said motor included in an electric apparatus which further includes a blower fan driven by the motor.

10. The motor of claim 1, said motor included in an electric apparatus which further includes a blower fan driven by the motor.

11. The motor of claim 1, wherein the insulation resin and the stator core form the channel and a bottom surface of the channel such that the insulating resin forming the bottom surface supports the conductive pin that extends past the edge of the stator core.

12. The motor of claim 1, wherein each of the first and second ends include biting means for biting into the wound surface of the stator core and the bracket, respectively, when the bracket is press-fit to the stator.

* * * * *